Nov. 19, 1968 G. F. PREHMUS 3,412,375
DOPPLER SHIFT AIRCRAFT LANDING AID AND METHOD
Filed Sept. 16, 1966 2 Sheets-Sheet 1
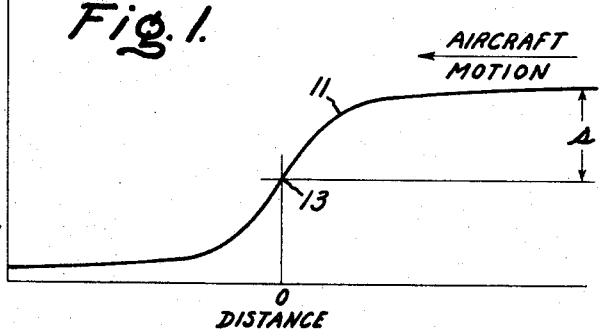
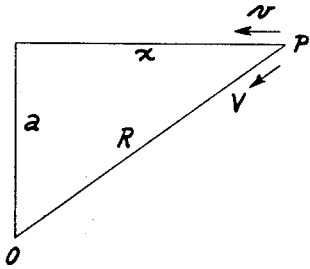
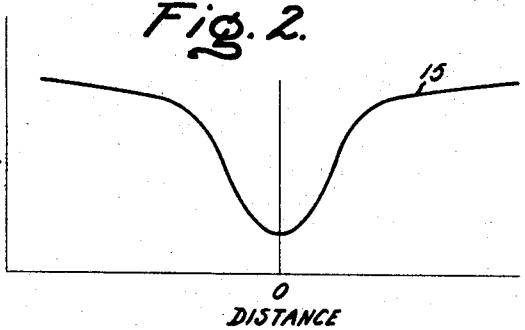
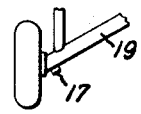
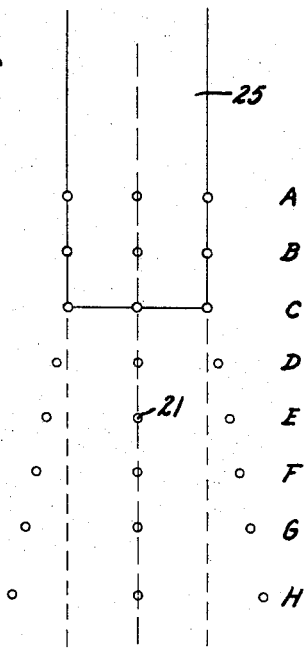
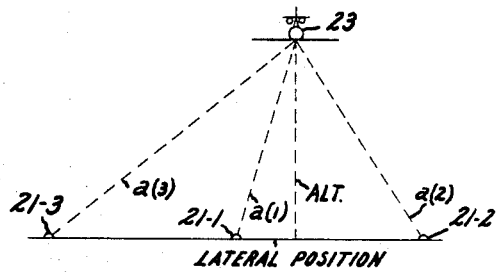
Inventor:
George F. Prehmus,
by Donald R. Campbell
His Attorney.

Inventor:
George F. Prehmus,
by Donald R. Campbell
His Attorney.

United States Patent Office

3,412,375
Patented Nov. 19, 1968

3,412,375
DOPPLER SHIFT AIRCRAFT LANDING AID AND METHOD
George F. Prehmus, Scotia, N.Y., assignor to General Electric Company, a corporation of New York
Filed Sept. 16, 1966, Ser. No. 579,864
5 Claims. (Cl. 340—16)

ABSTRACT OF THE DISCLOSURE

To locate an aircraft at altitudes of less than 200 feet when making a blind landing, one or more sets of sound transducers each mounted on the ground perpendicular to the end of the runway senses the rate of change of frequency of the aircraft sounds. Using a Doppler shift formula, the distance of closest approach to each transducer in a set is computed, from which the altitude and lateral position are determined by triangulation.

---

This invention relates to an aircraft landing aid and method for measuring the altitude and lateral position of an aircraft during the final approach to a landing runway when the altitude is less than a few hundred feet. More particularly, the invention relates to an aircraft landing aid and method operative at altitudes of less than about 200 feet which is based on the Doppler shift of sounds emitted by the aircraft.

There is at present no practical system for determining accurately the location of an aircraft below altitudes of about 200 feet along the approach to a runway when a blind landing is to be made. Although radar vectoring methods are suitable for longer distances and higher altitudes, radar involves electromagnetic waves travelling at the speed of light, and at short ranges the ratio of the distance being measured to the speed of light is so small that major inaccuracies result. Altimeters on the aircraft itself also are inaccurate at extremely low altitudes and there is further no information available on the aircraft as to its lateral position with respect to the landing strip. Due to the inability to obtain accurate data on the position of the aircraft at short ranges below an altitude of about 200 feet, blind landings are ordinarily not attempted and the usual situation is that there are no landings unless the minimum visibility exceeds this altitude.

Accordingly, an object of the invention is to provide a generally improved and more satisfactory landing aid for aircraft for determining the altitude and lateral position of the aircraft at short ranges below altitudes of a few hundred feet.

Another object is the provision of a new and improved aircraft landing aid and method utilizing the Doppler shift of sounds emanating from the aircraft to locate the aircraft during the final approach to the landing strip when making a blind landing.

Yet another object of the invention is to provide a new and improved method and apparatus for measuring accurately altitudes of aircraft of less than about 200 feet, wherein the accuracy of the measurement increases as the altitude decreases.

The Doppler effect refers to the shift in frequency or pitch of sound when there is relative motion between the source of sound and the recipient. When the recipient is at rest and the source of sound is in motion, the frequency sensed by the recipient is higher than the true frequency as the source moves toward the recipient, and is lower than the true frequency as the source moves away from the recipient. The rate of change of frequency is greatest when the source is at the point of closest approach to the recipient, and at this point it is the true frequency which is sensed. In accordance with the invention, this effect is utilized to determine the distance between a moving aircraft and various points on the ground, thus providing data from which the altitude and the lateral position of an aircraft can be determined during the final approach to the landing runway as for instance when making a blind landing. At least two sound transducers such as microphones are mounted on the ground on a line extending approximately perpendicular to the length of the runway, and there may be a plurality of sets of transducers along the length of the runway or its extension. The natural aircraft sound or sounds from a source mounted at a low point on the aircraft are sensed. The distance to the transducer of any one set at the point of closest approach can be determined from the rate of change of frequency at this point, the velocity of the aircraft, the speed of sound, and the true frequency of the sound. By knowing two such closest approach distances and the locations of the two transducers, the location in space of the aircraft at the time of closest approach can be determined thus providing both the altitude of the aircraft and its lateral position with respect to the transducers.

The foregoing and other objects, features and advantages of the invention will be apparent from the following more particular description of a preferred embodiment of the invention, as illustrated in the accompanying drawing wherein:

FIG. 1 is a plot of distance versus frequency sensed, F, as an aircraft moves from right to left past an observer;

FIG. 2 is a plot of distance versus rate of change of frequency sensed, $dF/dt$, for the relationship shown in FIG. 1;

FIG. 3 is a geometrical diagram useful in explaining the principles of the invention;

FIG. 4 is a partial front elevational view of an aircraft landing gear showing a source of sound mounted on the landing gear;

FIG. 5 is a diagrammatic elevational view of an aircraft making a landing and a set of sound transducers on the ground;

FIG. 6 is a diagrammatic plan view of the end portion of a landing runway and its extension illustrating the placement of sets of sound transducers;

Figure 7:
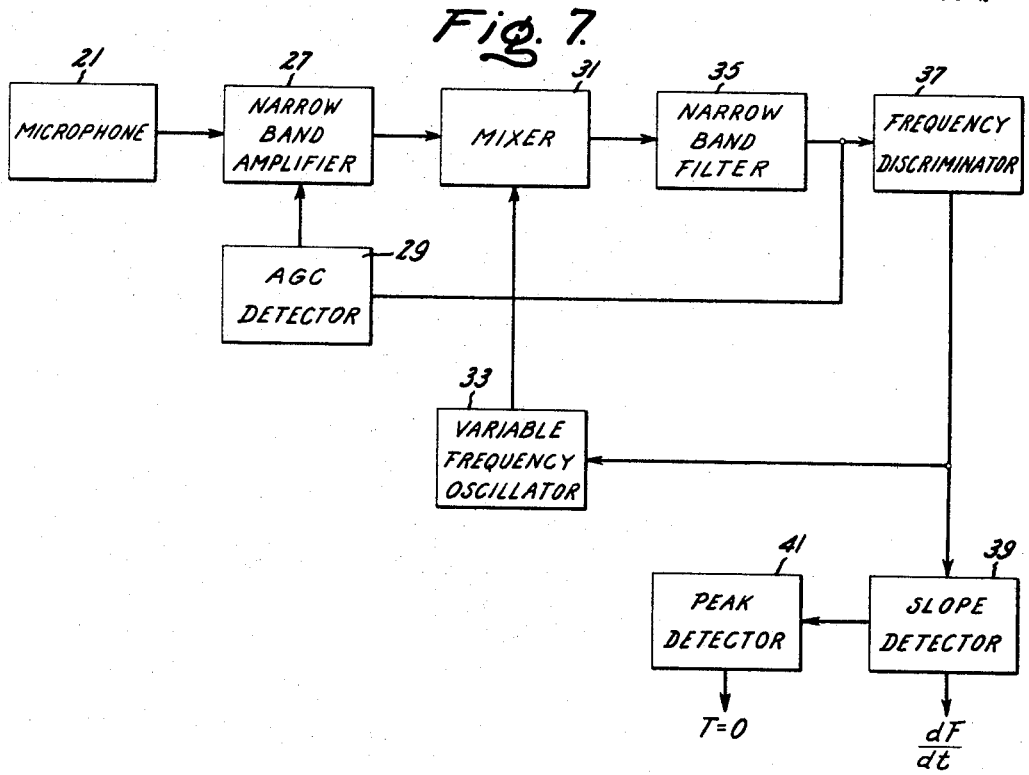
FIG. 7 is a diagrammatic block diagram of an apparatus for determining the rate of change of frequency sensed, $dF/dt$, at the point of closest approach.

Assuming that the aircraft motion is along a straight line from right to left in FIG. 1, the curve 11 shows the change in frequency, F, sensed by a recipient or observer O as the aircraft approaches the observer, passes overhead and then moves away in the opposite direction. Assuming that the observer O is at rest, the frequency heard by the observer is higher than the true frequency as the aircraft moves toward the observer, and is lower than the true frequency as the aircraft moves away from the observer, there being a rapid change of frequency as the aircraft passes directly overhead. This shift in frequency or pitch of sound when there is relative motion between the source of sound and the observer is known as the Doppler effect. It will be noted that the Doppler shift in sound produced by the aircraft traces an S curve as the aircraft passes by the fixed observer O, the point of inflection 13 of the S curve occurring when the closest point of approach to the observer is made. As can be seen better in the curve 15 in FIG. 2, wherein the rate of change of frequency sensed by the observer, $dF/dt$, is plotted against distance, the greatest rate of change of frequency occurs at the inflection point 13. The frequency F at inflection point 13 is moreover the true or transmitted frequency.

It will be shown that the rate of change of frequency at the inflection point of the curve 11 in FIG. 1 provides the critical information needed to determine the distance between the aircraft and the observer at the point of closest approach. As will be explained in greater detail later, sounds emitted by the aircraft or by a source of sound mounted on the aircraft are detected or sensed by a suitable sound transducer such as a microphone placed at the fixed position of the observer. The invention is particularly useful in locating an aircraft along the approach to the landing strip when a blind landing is being made and the aircraft has reached altitudes of less than about 200 feet. The diagram shown in FIG. 3 will be useful in explaining the mathematical derivation of the formula for the distance of closest approach. The aircraft P as it is making its landing approach is moving at a constant velocity $v$ along a straight line as shown by the arrow. While different sizes of aircraft have different recommended landing approach velocities, the pilot of a particular aircraft attempts to keep his landing approach velocity constant at a recommended figure for his aircraft. The observer is located at a distance $a$ from the line of flight. The distance $a$ is the altitude when the aircraft passes directly overhead of the observer, otherwise it is the distance to the point of closest approach. The distance between the aircraft and the observer is R, and the velocity of the aircraft with respect to the observer is V in the direction of the arrow. Further, the horizontal distance between the observer and the aircraft is $x$.

It can be said that
$$R^2 = a^2 + x^2$$

Taking the first time derivation, remembering that $a$ is a constant, there is obtained
$$R\frac{dR}{dt} = x\frac{dx}{dt}$$

But $dR/dt = V$ and $dx/dt = v$; therefore,
$$RV = xv$$

Differentiating again, realizing that $v$ is a constant, there is obtained
$$R\frac{dV}{dt} + V^2 = v^2$$

Rearranging,
$$dV/dt = v^2 - V^2/R$$

At the point of closest approach, $R = a$ and $V = 0$. Then, (1)
$$\frac{dV}{dt} = \frac{v^2}{a} \text{ or } a = \frac{v^2}{\frac{dV}{dt}}$$

Turning now to considerations of sound propagation, the observer O hears or senses a frequency F which is the sum of the true or transmitted frequency, $f_t$, and the Doppler shifted frequency:
$$F = f_t + \frac{f_t V}{S}$$

where S is the speed of sound. Differentiating this, where $f_t$ is a constant, (2)
$$\frac{dF}{dt} = \frac{f_t}{S}\frac{dV}{dt}$$

Combining Equations 1 and 2, (3)
$$a = \frac{v^2 f_t}{S\frac{dF}{dt}}$$

In accordance with Equation 3 the distance at the point of closest approach, $a$, can be determined by taking the product of the square of the approach velocity, $v$, and the true frequency, $f_t$, of sounds emitted by the aircraft; and dividing by the speed of sound, S, and the rate of change of frequency, $dF/dt$, heard or sensed by the observer O at the point of closest approach. Each of the quantities required to solve for $a$ can be measured from the ground or can be obtained in advance or, in the case of the velocity, $v$, can be obtained by radio from the aircraft.

In determining the distance of closest approach of an aircraft to a sound transducer or microphone placed at the position of the observer, the natural sounds of the motor, etc., produced by the aircraft can be utilized. However, the natural aircraft sounds are not spectrally pure and therefore are difficult to work with. It is desirable to provide a source of sound such as a wind driven whistle mounted on a low, exposed point on the aircraft. For example, a whistle 17 (FIG. 4) can be mounted on the landing gear 19 of the aircraft at the lowest and most exposed possible point. The sound produced by the whistle should be loud enough to be picked out of the aircraft noises and is preferably at a higher pitch, in the order of 1000 to 2000 c.p.s. In the description to follow and in the claims either one or both of the natural aircraft sounds or the whistle sounds are referred to as the aircraft sounds. With the source of sound mounted on the landing gear, it will of course be appreciated that any measurements of the altitude and lateral position of the aircraft are in fact the measurements to the right or left landing gear, as the case may be. The present invention covers only the apparatus and method for measuring the altitude and lateral position of the aircraft as the landing approach to a runway is made during a landing, and does not include the manner in which this information will be presented to the pilot.

In FIG. 5 is shown an aircraft 23 in flight whose location is to be determined. At least two microphones 21–1 and 21–2 or other suitable pick up means are required to determine the precise location of the aircraft 23. The positions of all microphones must be precisely known. The two microphones are each indicated by a half circle and are on the ground at spaced positions along a line extending approximately perpendicular to the line of flight of the aircraft. The distance of closest approach $a(1)$ is measured for the one microphone 21–1, and simultaneously the distance of closest approach $a(2)$ for the other microphone 21–2 is measured. By simple trilateration the altitude of the aircraft 23 and its lateral position with respect to the microphones can be calculated. In a practical system at an airport it is preferable to use a third microphone 21–3 located in line with the other two microphones for measuring a third distance of closest approach $a(3)$. In this case the central microphone 21–1 is located on the longitudinal axis of the runway or its extention with the other two microphones 21–2 and 21–3 equidistant on either side. The aircraft 23 at the time it passes overhead the set or row of microphones ordinarily is between the two outermost microphones. In this situation the shortest distance of closest approach $a(1)$ to the central microphone 21–1 is measured more accurately. Thus the three microphone set gives a better measurement of altitude. Although the use of three microphones per set is somewhat redundant since two would do, it is felt that the system should provide the best possible position determination.

FIG. 6 shows the end of a landing runway 25 and an array of microphones 21 (each indicated by a small circle) arranged in proximity to the end of the runway. The array is symmetrical and is composed of a plurality of sets or rows of three microphones, each set mounted on the ground on a line extending approximately perpendicular to the longitudinal axis of the runway or its extension, the axis or centerline being indicated by a dashed line. The various rows are identified by the letters A–H. The first three rows A–C are actually on the end of the runway 25 with the center microphone of each row being on the longitudinal axis while the other two microphones in each row are respectively located at either side of the runway. The other rows of microphones D–H are mounted along an extension of the runway in the path of a landing aircraft. For these latter rows the central microphone of each row is located along an extension of the axis of the runway, however the lateral spacing of the two side microphones in any one row increases from row D to row H. By making the lateral spacing of the two side microphones in each now a function of distance from the runway, greater latitude of measurement is provided to properly locate and guide the aircraft as the landing is being made. Only one set or row of microphones is used at a time, measurements of altitude and lateral position of the aircraft being made sequentially as the aircraft passes overhead the various sets of microphones. The electronic position measuring equipment accepting the signals from the microphones 21 may be switched after the inflection point 13 (FIG. 1) is reached for each set of microphones, as no further useful data are obtained after that time.

As was mentioned previously, the critical information needed to determine the distance of closest approach $a$ is the rate of change of frequency at the inflection point 13 on the curve 11 of frequency, F, versus distance, where F is the frequency sensed by the observer or a sound transducer at a fixed location. At the inflection point 13, the rate of change of frequency $dF/dt$ is greatest and has its peak value. Various electronic equipment can be used for measuring the rate of change of frequency at the inflection point. In FIG. 7 is shown one such apparatus which operates by essentially following one frequency to see what happens to it and produces a voltage output which is directly proportional to the slope of the frequency. The output of a microphone 21 or other suitable type of sound detector is fed through a narrow band amplifier 27 whose output signal is maintained at a substantially constant level by an AGC detector device 29. The output of the narrow band amplifier 27 is coupled to a mixer 31 which has another input from a variable frequency oscillator 33. In the mixer 31 the sum and the difference of the amplified microphone frequency and the frequency from the variable frequency oscillator are produced, and the sum frequency is selected by a narrow band filter 35. A frequency discriminator 37 accepts the signal from the narrow band filter 35 and produces a DC voltage output whose magnitude is directly proportional to the frequency. This DC voltage also controls in a linear fashion the frequency of the variable frequency oscillator 33 and thereby provides a closed loop which maintains the output frequency of the mixer circuit 31 within narrow limits. Also, the output of the narrow band filter 35 is coupled to the AGC detector 29. In the operation of the circuit shown in FIG. 7, it will be seen that the variable frequency oscillator 33 supplies a frequency such that when added to the signal frequency, a substantially constant frequency output is produced at the output of the narrow band filter 35. For instance, let it be assumed that the Doppler shifted frequency at the level right hand portion of the curve shown in FIG. 1 is 1100 c.p.s. and the frequency at the inflection point 13 is 1000 c.p.s. The narrow band amplifier 27 passes at least these frequencies and rejects other noises such as engine noises and the like. Where the narrow band filter 35 passes for example 1500 c.p.s., then the variable frequency oscillator 33 produces an output of 400 c.p.s. when 1100 c.p.s. is received at the microphone 21, and 500 c.p.s. when 1000 c.p.s. is received at the microphone, and corresponding frequencies between these two points. Consequently the DC voltage output of the frequency discriminator 37 is directly proportional to the frequency F sensed by the microphone 21. A slop detector 39 coupled to this output DC voltage produces the rate of change of frequency $dF/dt$. A peak detector 41 in like manner differentiates the DC voltage output of the slope detector 39 to provide an indication of the time ($T=0$) when the greatest rate of change of frequency occurs. The output of the peak detector 41 can be used with the slope detector 39 to produce an indication of slope only when the peak is determined, and in this case the output $dF/dt$ of the slope detector 39 is the rate of change of frequency at the inflection point 13. This, it will be recalled, is the $dF/dt$ which appears in the Equation 3.

The other quantities shown in Equation 3 can be measured in a variety of ways. The velocity $v$ of the aircraft can be determined by measuring the time required for the aircraft to pass from one row of microphones in FIG. 6 to another row, the distance between the rows of microphones of course being known. The times of closest approach are used. The velocity $v$ can also be measured by determining the frequency shift $s$ (FIG. 1) between the time when the aircraft is at a great distance and the time of closest approach, using the equation for the Doppler shifted frequency given above where V is $v$ at the point of closest approach. The velocity of the aircraft can also be obtained by radio from the aircraft itself, or by means of a ground based radar system. The speed of sound S is fairly constant but does vary slightly with temperature, humidity and pressure. The true value can easily be calculated after the atmospheric characteristics have been measured. The transmitted or true frequency $f_t$ can be measured at the aircraft and the value transmitted to the ground. In the case where a whistle 17 (FIG. 4) is mounted on the landing gear 19, the frequency is constant and is known ahead of time. As another method, the frequency F at the inflection point 13 (FIG. 1) is the transmitted or true frequency $f_t$. In the circuit of FIG. 7, $f_t$ can be measured by evaluating the DC voltage output of the frequency discriminator 37 at the time ($T=0$) that the detector 41 indicates a peak in $dF/dt$.

Figure 8:
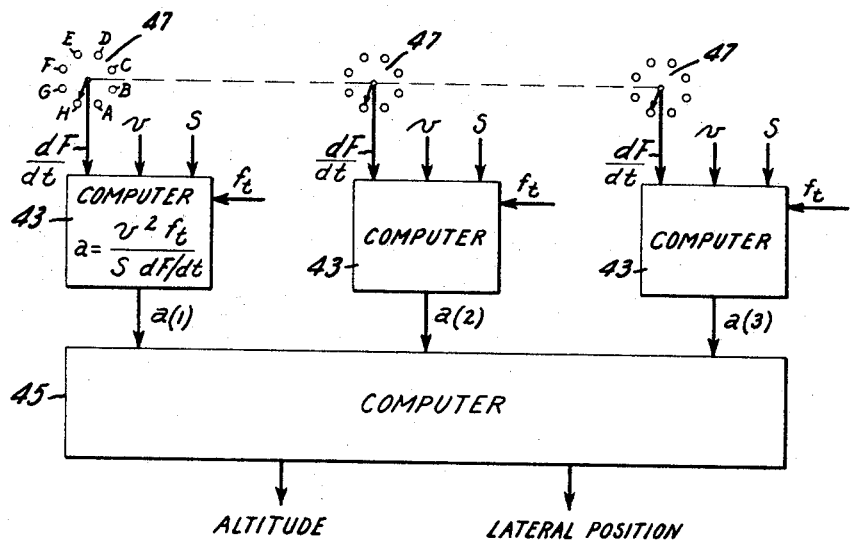
FIG. 8 is a diagrammatic block diagram of an apparatus for computing the altitude and lateral position of the aircraft.

Knowing the four quantities shown in Equation 3, the distance of closest approach $a$ for each of the microphones 21 in a set or row of three microphones can be determined. This is illustrated in schematic form in FIG. 8 wherein the computer 43 operates on derived signals which are representative of each of the quantities $dF/dt$ at the point of closest approach, $v$, S and $f_t$. The computer 43 produces an output signal representative of the distance of closest approach, as for instance the quantity $a(1)$. Two other computers simultaneously produce signals representative of the distances of closest approach $a(2)$ and $a(3)$. Signals representative of these three closest approach distances are introduced into still another computer 45 which in turn produces output signals representative of the altitude of the aircraft and its lateral position. Ordinarily the lateral position with respect to the central microphones of each set located on the longitudinal axis of the runway or its extension is calculated.

When using the microphone array shown in FIG. 6, the altitude and lateral position at each of the rows H through A are determined sequentially to provide a continuous indication of the location of the aircraft as the landing approach is made during a landing. The switching of electronic measurements from one row to the next in sequence is shown schematically in FIG. 8 where the switching need only be applied to the quantity $dF/dt$. The other quantities, namely the aircraft velocity $v$, the speed of sound S, and the true or transmitted frequency $f_t$ of the sounds emitted by the aircraft, can be taken to be a constant for any one aircraft as a single landing is made. Thus the value $dF/dt$, the rate of change of frequency at the inflection point, is proportional to $a$, the distance to the aircraft at the point of closest approach. A switch 47 is shown schematically as a device for switching from one set of microphones to the next as the landing approach is being made. Since all the information that is needed has been obtained when the inflection point is reached, the switching may be done at this time.

Although there are some inaccuracies in the use of this method and apparatus for measuring the altitude and lateral position of an aircraft at altitudes below about 200 feet during the final approach to a landing strip, useful measurements of the location of the aircraft to within an error of about 5% to 10% of the total distance can be obtained. Consequently the system can be used for making blind landings. An advantage of the system, in contrast to conventional radar methods, is that there is increasing accuracy as the distance becomes shorter. A possible source of inaccuracy which has not yet been noted is the effect of wind. Normally a landing is made into the wind, and this affects the velocity $v$ of the aircraft. However the wind velocity can be measured and the effect on the Doppler shift can be calculated by known techniques. As was mentioned previously, the manner in which the information is presented to the pilot as the landing is being made is not here discussed, however it will be apparent that the information on the location of the aircraft can be presented continuously to the pilot as the landing is being made to enable a blind landing to be made even when the visibility is nearly zero.

While the invention has been particularly shown and described with reference to a preferred embodiment thereof, it will be understood by those skilled in the arts that various changes in form and details may be made therein without departing from the spirit and scope of the invention.

What I claim as new and desire to secure by Letters Patent of the United States is:

1. An aircraft landing aid system for determining the altitude and lateral position of an aircraft below altitudes of about 200 feet by utilizing the Doppler shift of sounds emanating from the aircraft as the final approach to the landing runway is being made, comprising
a set of at least two sound transducers mounted on the ground in proximity to the end of the runway on a line extending substantially perpendicular to the longitudinal axis of the runway,
said transducers each producing a signal representative of the sounds emanating from the aircraft as the aircraft makes the final approach to the runway at a substantially constant velocity passing approximately overhead the set of transducers,
means for determining the rate of change of frequency of the aircraft sounds at the point of closest approach for each of said transducers,
means for computing the distance between each said transducer and the aircraft at the point of closest approach according to the formula $$a = \frac{v^2 f_t}{S(dF/dt)}$$

where
$v$ = approach velocity of aircraft,
$f_t$ = true frequency of aircraft sounds,
$S$ = speed of sound, and
$dF/dt$ = rate of change of frequency of aircraft sounds at point of closest approach $a$, and
means for computing the altitude and lateral position of the aircraft from the point of closest approach distances.

2. An aircraft landing aid system for determining the altitude and lateral position of an aircraft below altitudes of about 200 feet by utilizing the Doppler shift of sounds emanating from the aircraft as the final approach to the landing runway is being made, comprising
a set of at least two sound transducers mounted on the ground in proximity to the end of the runway on a line extending substantially perpendicular to the longitudinal axis of the runway,
said transducers each producing a signal representative of the sounds emanating from the aircraft as the aircraft makes the final approach to the runway at a substantially constant velocity passing approximately overhead the set of transducers,
means for determining the rate of change of frequency of the aircraft sounds at the point of closest approach for each of said transducers,
means for computing the distance between each said transducer and the aircraft at the point of closest approach, and
means for computing the altitude and lateral position of the aircraft from the point of closest approach distances,
wherein there are an array of said sound transducers mounted on the ground at the end of the runway and the extension of the runway,
said array comprising a plurality of said sets arranged in rows which are substantially parallel to one another and are spaced along the longitudinal axis of the runway and the extension thereof, and
means for switching from one of the sets of sound transducers to the next in sequence,
the altitude and lateral position of the aircraft being computed sequentially as the landing approach is made and the aircraft passes overhead of each of the sets of sound transducers.

3. A system as defined in claim 2 wherein said sets of sound transducers each comprises three transducers centered on the longitudinal axis of the landing runway or the extension thereof, the lateral spacing of the transducers in each of said sets increasing as the distance of each of said sets mounted beyond the end of the runway increases therefrom.

4. An aircraft landing aid system for determining the altitude and lateral position of an aircraft below altitudes of about several hundred feet by utilizing the Doppler shift of sounds emanating from the aircraft as the final approach to the landing runway is being made, comprising
a set of at least two sound transducers mounted on the ground in proximity to the end of the runway in a row extending substantially perpendicular to the longitudinal axis of the runway,
said transducers each producing a signal representative of the sounds emanating from the aircraft as the aircraft makes the final approach to the runway at a substantially constant velocity passing approximately overhead the set of transducers,
means for deriving a signal representative of the rate of change of frequency of the aircraft sounds at the point of closest approach to each of said transducers,
means for deriving signals representative of the distances between each said transducer and the aircraft at the point of closest approach,
means for deriving signals from the point of closest approach distances which are representative of the altitude and lateral position of the aircraft,
a plurality of said sets of sound transducers each including three of the transducers,
said sets being mounted on the ground in substantially parallel rows spaced from one another along the longitudinal axis of the runway and the extension thereof and being symmetrical thereabout,
each of said sets having means for deriving signals representative of the rate of change of frequency of the aircraft sounds at the point of closest approach to each of the three transducers included in the set, and
means for switching from one of said sets to the next in sequence as the aircraft is making the final approach,
whereby signals are derived sequentially which are representative of the altitude and lateral position of the aircraft with respect to each of said sets of transducers.

5. A method for locating an aircraft during the final approach to a landing runway by utilizing the Doppler shift of sounds emitted by the aircraft, comprising the steps of
detecting the aircraft sounds on the ground in proximity to the end of the runway at a plurality of spaced positions along a row extending substantially perpendicular to the longitudinal axis of the runway as the aircraft passes approximately overhead at a substantially constant velocity, deriving first signals representative of the rate of change of frequency of the aircraft sounds at the point of closest approach to each of said detecting positions, deriving second signals each representative of the distance between one of said detecting positions and the point of closest approach of the aircraft, said second signals each being dependent on the value of the corresponding one of said first signals and other signals representative of the velocity of the aircraft, the speed of sound, and the true frequency of the aircraft sounds, deriving third signals dependent on the value of said second signals which are representative of the altitude and lateral position of the aircraft, sequentially detecting the aircraft sounds at a plurality of spaced positions along other rows which extend substantially perpendicular to the longitudinal axis of the runway at the end of the runway and the extension thereof, and deriving said first signals, second signals and third signals sequentially for each of said rows to provide an indication of the altitude and lateral position of the aircraft with respect to each of said rows as the aircraft passes overhead while making the landing approach.

References Cited

UNITED STATES PATENTS

| | | | |
|---|---|---|---|
| 2,956,278 | 10/1960 | Branchu | 340—3 |
| 2,098,240 | 11/1937 | Hayes | 340—3 |
| 1,785,307 | 12/1930 | Hammond | 340—16 |

FOREIGN PATENTS 778,931  3/1936  France.

RODNEY D. BENNETT, *Primary Examiner.*

J. G. BAXTER, *Assistant Examiner.*